United States Patent [19]

Tamura et al.

[11] Patent Number: 5,224,565

[45] Date of Patent: Jul. 6, 1993

[54] TRACTION CONTROL FOR MOTOR VEHICLES

[75] Inventors: Minoru Tamura, Yokohama; Takashi Imaseki, Zushi; Toru Iwata, Yokohama, all of Japan

[73] Assignee: Nissan Motor Co., Ltd., Yokohama, Japan

[21] Appl. No.: 712,891

[22] Filed: Jun. 12, 1991

[30] Foreign Application Priority Data

Jun. 12, 1990 [JP] Japan .................. 2-153789

[51] Int. Cl.⁵ .............................................. B60K 31/00
[52] U.S. Cl. ........................................ 180/197; 123/333
[58] Field of Search .............. 180/197; 123/333, 481, 123/332

[56] References Cited

U.S. PATENT DOCUMENTS

| | | | |
|---|---|---|---|
| 4,637,487 | 1/1987 | Nakamura et al. | 180/197 |
| 4,917,208 | 4/1990 | Komoda | 180/197 |
| 4,921,064 | 5/1990 | Wazaki et al. | 180/197 |
| 4,951,773 | 8/1990 | Poirier et al. | 180/197 |
| 5,012,882 | 5/1991 | Oono et al. | 180/197 |
| 5,025,881 | 6/1991 | Poirier et al. | 180/197 |
| 5,038,883 | 8/1991 | Kushi et al. | 180/197 |
| 5,099,942 | 3/1992 | Kushi et al. | 180/197 |

FOREIGN PATENT DOCUMENTS 62-91643 4/1987 Japan.
62-214241 9/1987 Japan.

OTHER PUBLICATIONS

Society of Automotive Engineers, Inc. #870337, "AS-R—Traction Control—A logical Extension of ABS", Maisch et al.

Primary Examiner—Margaret A. Focarino
Assistant Examiner—Carla Mattix
Attorney, Agent, or Firm—Foley & Lardner

[57] ABSTRACT

A traction control is effected by an engine torque reduction with fuelcut operation. In order to prevent deterioration of a catalytic converter during split cylinder operation, a number and an arrangement of cylinders to be disabled are determined in response to a slip rate and a parameter indicative of exhaust gas temperature, respectively.

10 Claims, 7 Drawing Sheets

FIG. 5

| | TBL1 | | | | | |
|---|---|---|---|---|---|---|
| V | #1 | #2 | #3 | #4 | #5 | #6 |
| "0" | – | – | – | – | – | – |
| "1" | C | – | – | – | – | – |
| "2" | C | C | – | – | – | – |
| "3" | C | C | C | – | – | – |
| "4" | C | C | C | C | – | – |
| "5" | C | C | C | C | C | – |
| "6" | C | C | C | C | C | C |

FIG. 6

| | TBL2 | | | | | |
|---|---|---|---|---|---|---|
| V | #1 | #2 | #3 | #4 | #5 | #6 |
| "0" | – | – | – | – | – | – |
| "1" | C | – | – | – | – | – |
| "2" | C | – | – | C | – | – |
| "3" | C | – | C | – | C | – |
| "4" | C | – | C | C | – | C |
| "5" | C | C | C | C | – | C |
| "6" | C | C | C | C | C | C |

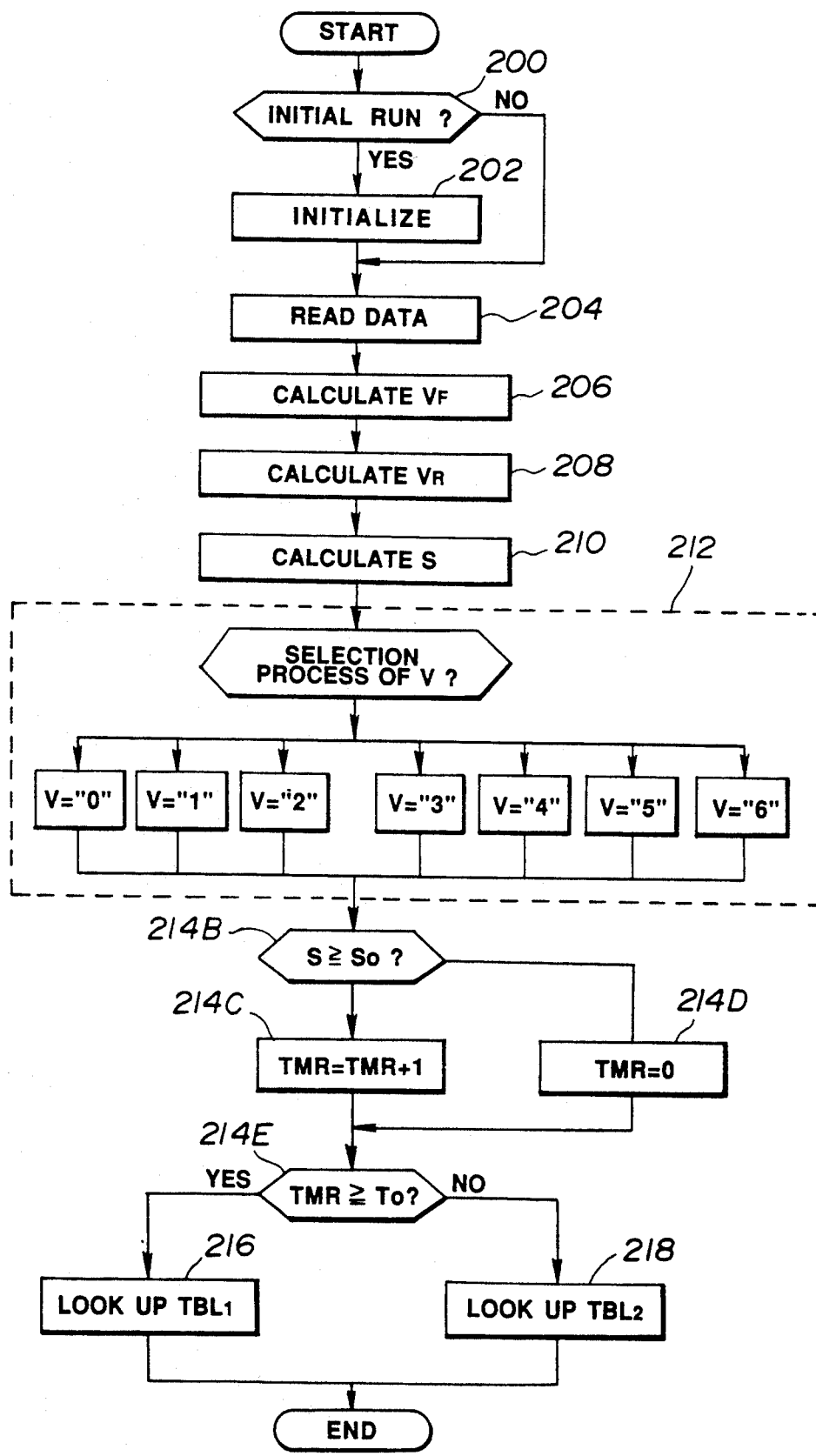

TRACTION CONTROL FOR MOTOR VEHICLES

BACKGROUND OF THE INVENTION

The present invention relates to a traction control in a motor vehicle, and more particularly to a traction control by engine torque reduction.

Japanese Patent Application First (unexamined) Publication No. 62-91643 discloses a traction control in a vehicle by engine torque reduction. According to this engine torque reduction control, a portion of the cylinders are disabled by fuelcut operation in response to a slip rate of the vehicle. According to this known system, an arrangement of the cylinders to be disabled is fixed.

An object of the present invention is to improve a traction control of the above kind such that an increase in exhaust gas temperature during split operation of the engine is suppressed in order to prevent deterioration of a catalytic converter.

SUMMARY OF THE INVENTION

According to one aspect of the present invention, there is provided a method of a traction control in a vehicle having a drive wheel and multi-cylinder engine with an exhaust system including a catalytic converter, the method comprising the steps of:

determining a slip rate of the vehicle and generating a slip rate indicative signal indicative of said slip rate determined;

determining, in number, a portion of the cylinders of the engine to be disabled in response to said slip rate indicative signal and generating a number indicative signal indicative of said number determined;

determining a parameter indicative of a temperature of exhaust gases issued by the engine during partial operation and generating a parameter indicative signal indicative of said parameter determined; and determining an arrangement of that portion of the cylinders indicated by said number indicative signal in response to said parameter indicative signal.

According to another aspect of the present invention, there is provided a system for a traction control in a vehicle having a drive wheel and a multi-cylinder engine with an exhaust system including a catalytic converter, means for determining a slip rate of the vehicle and generating a slip rate indicative signal indicative of said slip rate detected;

means for determining, in number, a portion of the cylinders of the engine to be disabled in response to said slip rate indicative signal and generating a number indicative signal indicative of said number determined;

means for determining a parameter indicative of a temperature of exhaust gases issued by the engine during partial operation and generating a parameter indicative signal indicative of said parameter determined; and means for determining an arrangement of that portion of the cylinders indicated by said number indicative signal in response to said parameter indicative signal.

BRIEF DESCRIPTION OF THE DRAWINGS

FIGS. 5 and 6 are tables illustrating various kinds of arrangements of cylinders to be disabled;

FIG. 8 is a flow diagram of another alternative to FIG. 4.

DETAILED DESCRIPTION OF THE INVENTION

The present invention is further described in connection with the accompanying drawings.

Referring to FIGS. 1 to 6, a first embodiment of a traction control system according to the present invention is explained. In this embodiment, the invention is applied to a front wheel front drive vehicle having left and right front wheels as drive wheels and left and right rear wheels as free running wheels.

Figure 1:
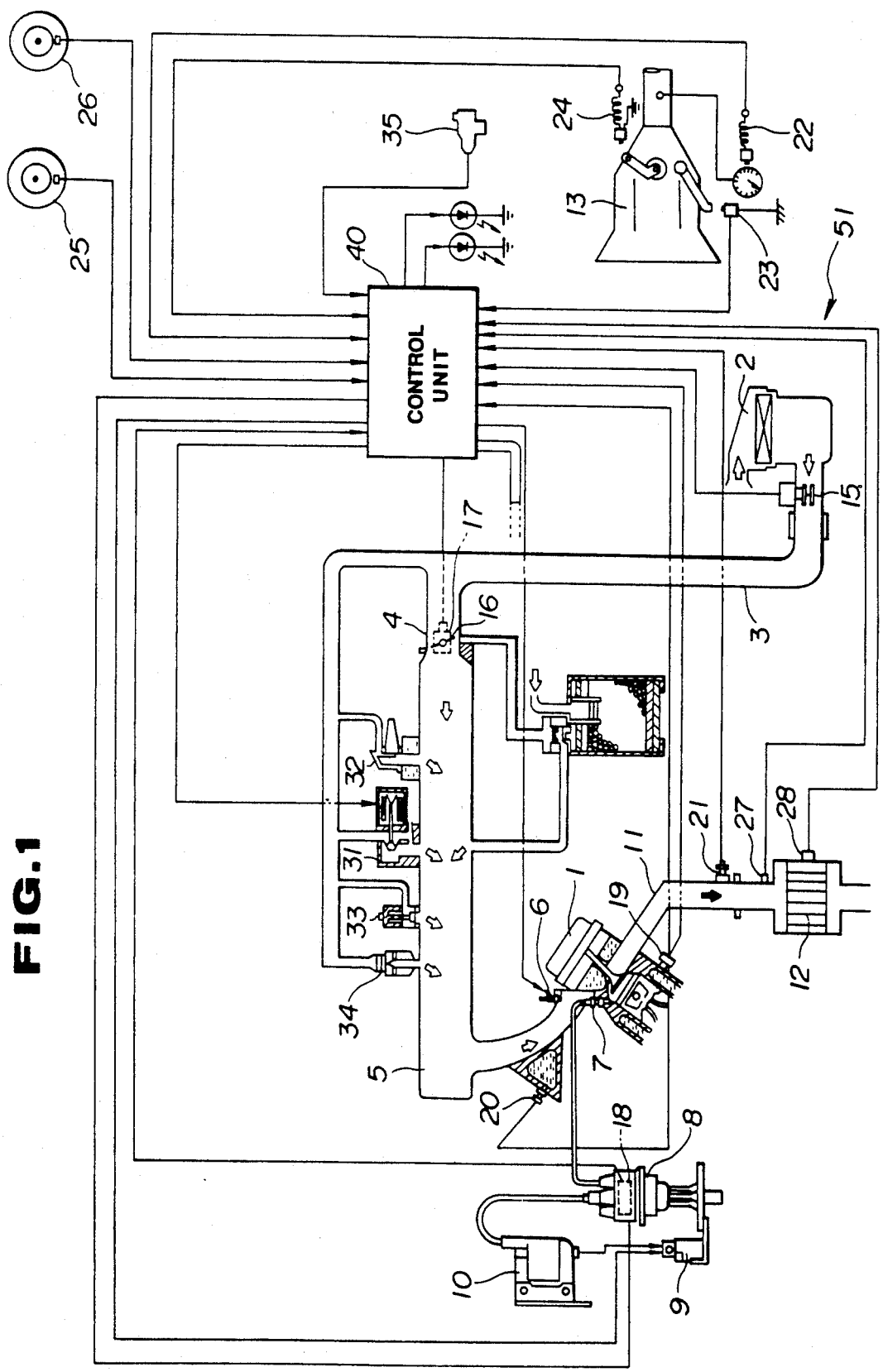
FIG. 1 is a diagram of a portion of an automotive vehicle having a multi-cylinder engine and a catalytic converter.

In FIG. 1, the reference 1 designates a multi-cylinder engine having six cylinders. Intake air flowing past an air cleaner 2 flows through an induction pipe 3 and a throttle chamber 4 to an intake manifold 5 where it is distributed by branches between cylinders of the engine 1. Fuel is injected into the cylinders by fuel injectors 6 to mix with intake air. Spark plugs 7 are installed for the cylinders, respectively. A high voltage pulse is supplied to a selected one of the spark plugs 7 by a distributor 8 at a timing when a power transistor 9 is energized. The mixture within each of the cylinders is ignited by a spark produced by the spark plug 7 and combusted into exhaust gases. The exhaust gases flow through an exhaust pipe 11 to a catalytic converter 12 where toxic components of the exhaust gases are purified with the aid of a three-way catalyst before being issued to the open air. Power produced by the engine 1 is transmitted via a transmission 13 to the drive wheels of the vehicle.

The flow rate of the intake air, which is controlled by a throttle valve 16 rotatably mounted in the throttle chamber 4, is detected by an air flow meter 15. The fully closed position of the throttle valve 16 is detected by a throttle valve switch 17. A crankshaft angle of the engine 1 is detected by a crankshaft angular position sensor 18 disposed in the distributor 8. Knocking occurring in the engine 1 is detected by a knocking sensor 19. Temperature of the engine coolant temperature is detected by a water temperature sensor 20. Oxygen concentration of the exhaust gases is detected by an oxygen sensor 21. Vehicle speed is detected by a vehicle speed sensor 22. Shift position of the transmission 13 is detected by a reverse switch 23. Neutral position of the transmission 13 is detected by a neutral switch 24. Drive wheel revolution speed sensors 25 are provided for two drive wheels, respectively, each being operative to detect a wheel revolution speed of one of the drive wheels. Free running wheel revolution speed sensors 26 are provided for two free running wheels, respectively, each being operative to detect a wheel revolution speed of one of the free running wheels. Input temperature of the catalytic converter 12 is detected by an input temperature sensor 27, and catalytic converter floor temperature is detected by a floor temperature sensor 28. The reference numeral 31 designates an auxiliary air control valve. The reference numeral 32 designates an air regulator. The reference numeral 33 designates a solenoid valve for an air conditioner. The reference numeral 34 designates a vacuum control valve. The reference numeral 35 designates a fuel pump.

Output signals of the above mentioned sensors 15, 17 to 28 are fed to a microcomputer based control unit 40. The control unit 40 performs a spark timing control, a fuel supply control and a traction control based on the signals fed thereto.

Figure 2:
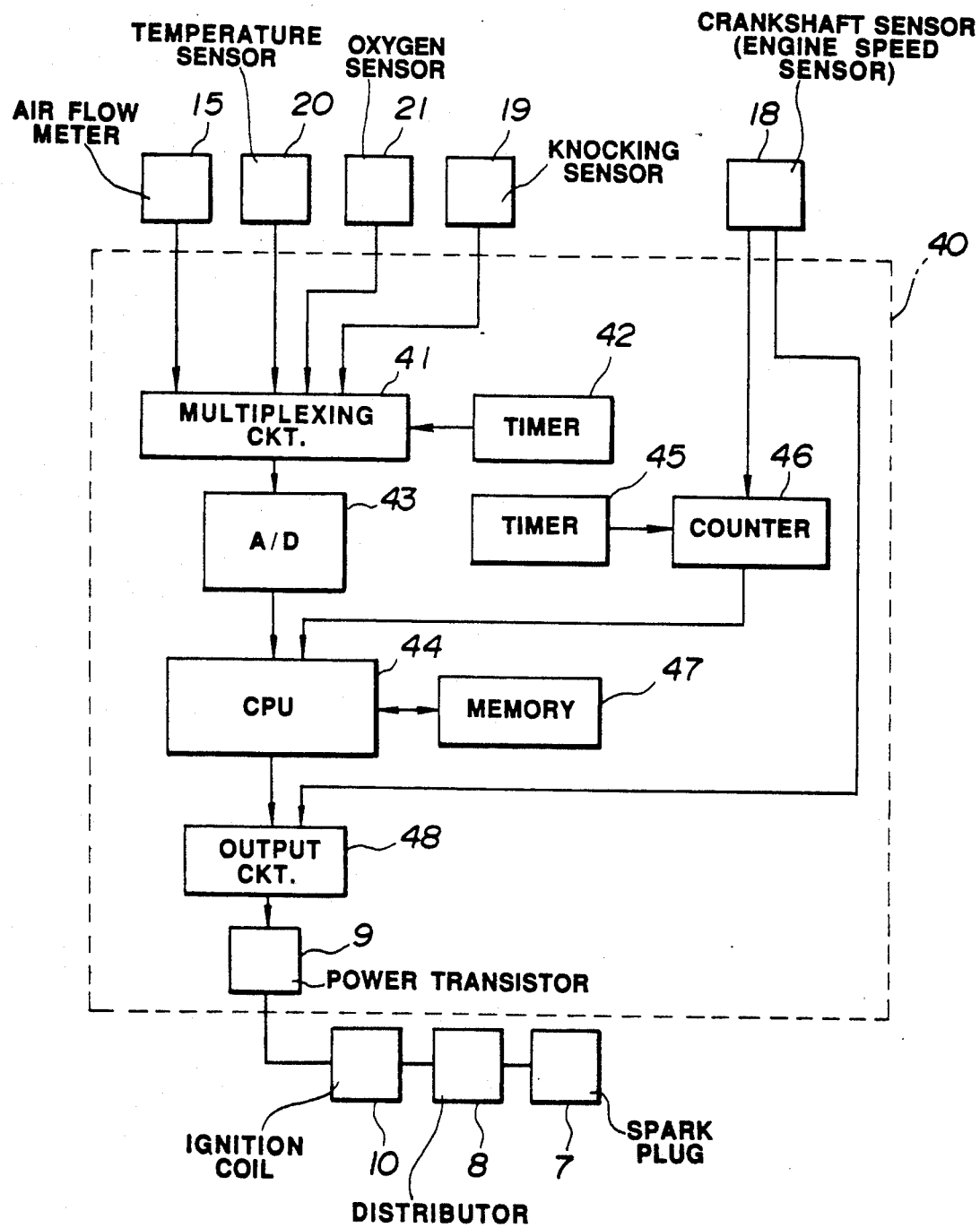
FIG. 2 is a block diagram illustrating a spark timing control.

FIG. 2 shows a block diagram illustrating a function performed by the control unit 40 in effecting the spark timing control. In FIG. 2, a time division type multiplexing is performed by a multiplexing circuit 41 and a timer 42. In the time division, the analog output signals of the air flow meter 15, water temperature sensor 20, oxygen sensor 21 and knocking sensor 19 are allowed to be fed to an analog to digital converter (A/D) 43 at different time intervals allocated sequentially. After being converted to digital signals, they are fed to the CPU 44. The number of output pulses of the crankshaft sensor 18 is counted by a counter 46 for a predetermined period of time set by a timer 45. The output of the counter 46, which is indicative of a revolution speed of the engine crankshaft, i.e., an engine revolution speed, is fed to the CPU 44. The CPU 44 is operatively connected with a memory 47 which includes a read only memory (ROM) and a random access memory (RAM). The signals fed to the CPU 44 are processed to provide an appropriate spark timing for varying running condition of the engine. The output of the CPU 44 is fed to an output circuit 48. Also fed to this output circuit 48 from the crankshaft sensor 18 is a reference angle signal. At a crankshaft angle determined by the CPU 44, a power transistor 9 is rendered ON to provide a spark signal to energize an ignition coil 10. The reference numeral 8 designates a distributor and the reference numeral 7 a spark plug or spark plugs. With the distributor 8, the spark plugs 7 produce sparks sequentially at timing determined by the CPU 44.

The operation is described below.

Describing a fuel injection control, a base fuel injection amount Tp is calculated based on intake air flow rate Qa and engine revolution speed N from the following equation, $$Tp = K \times Qa/N \qquad (1)$$

where, K: a constant.

Based on the engine coolant temperature, oxygen concentration of exhaust gases, and etc. a fuel injection amount Ti is given by correcting the base fuel injection amount Tp in a manner as expressed by the following equation, $$Ti = Tp \times (1 + K_{TW} + K_{AS} + K_{AI} + K_{ACC} + K_{DEC}) \times K_{FC} + Ts \qquad (2)$$

where,
$K_{TW}$: a coolant temperature correction coefficient,
$K_{AS}$: a start-up and warming-up correction coefficient,
$K_{AI}$: an idling correction coefficient,
$K_{ACC}$: an acceleration correction coefficient,
$K_{DEC}$: a deceleration correction coefficient,
$K_{FC}$: a fuelcut correction coefficient,
$T_S$: a battery voltage correction coefficient.

A pulse having a pulse width corresponding to the fuel injection amount Ti is supplied to each fuel injector 6. During this fuel injection control, a fuelcut control which will be explained in connection with a flow diagram shown in FIG. 3 is carried out.

Figure 3:
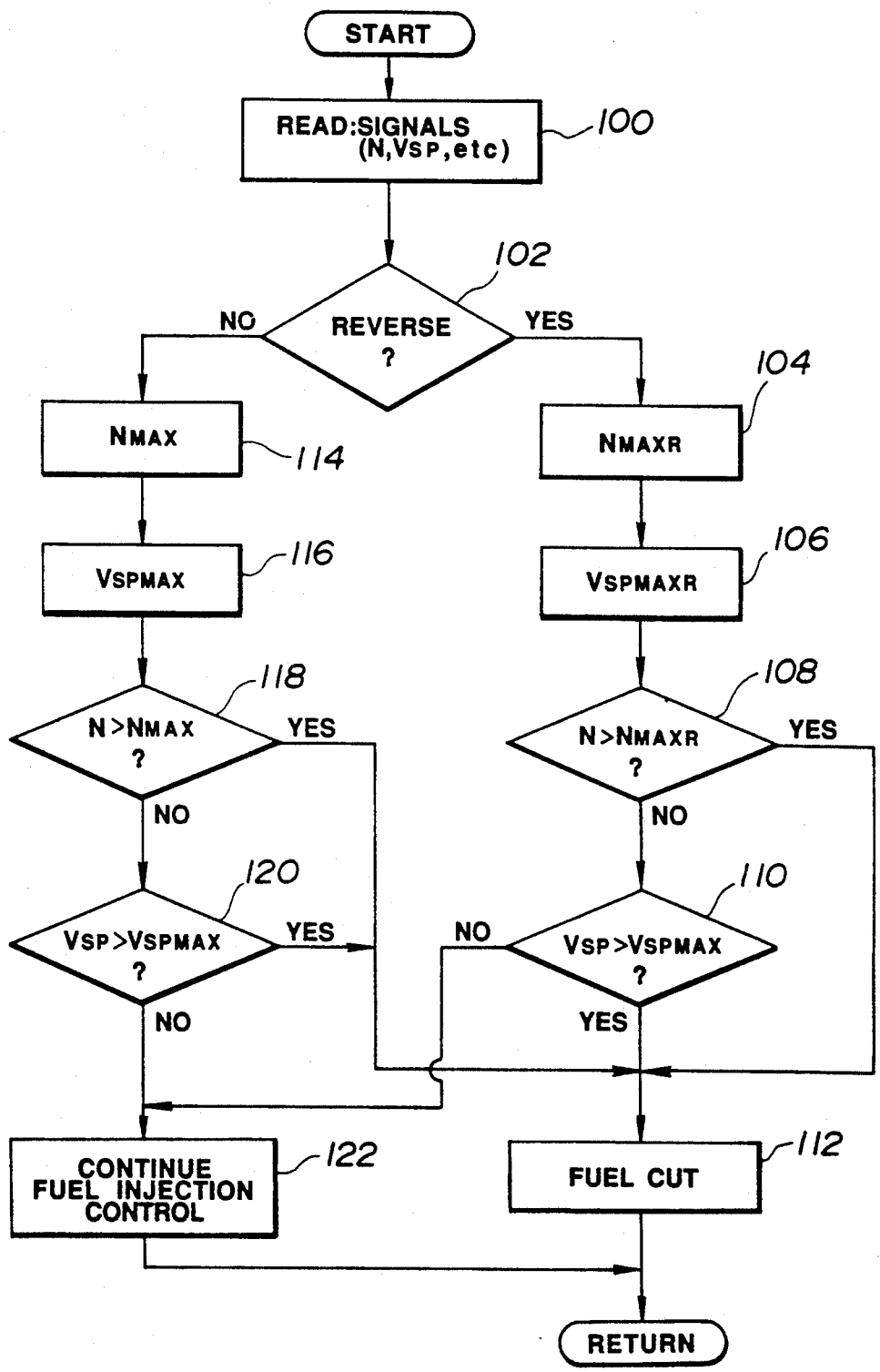
FIG. 3 is a flow diagram of a fuelcut routine.

FIG. 3 is a flow diagram illustrating the principle of operation of the fuelcut control. At a step 100 in FIG. 3, reading operations of various signals such as an engine revolution speed N, a vehicle speed $V_{SP}$, a shift position and etc. are performed. The vehicle speed $V_{SP}$ is an average of a left drive wheel revolution speed $V_{FL}$ and a right drive wheel revolution speed $V_{FR}$. There is an interrogation at a step 102 whether the shift position is for reverse drive or not. If affirmative, a second fuelcut engine speed $N_{MAXR}$ and a second fuelcut vehicle speed $V_{SPMAXR}$ are set at steps 104 and 106, respectively. There is an interrogation at a step 108 whether the engine revolution speed N is greater than the second fuelcut engine revolution speed $N_{MAXR}$ or not. If the interrogation at the step 108 results in negative, there is another interrogation at a step 110 whether the vehicle speed $V_{SP}$ is greater than the second fuelcut vehicle speed $V_{SPMAXR}$ or not. If the interrogation at the step 110 results in negative, there occurs no fuelcut and thus the fuel injection control continues (see a step 122). If the interrogation at the step 108 results in affirmative or the interrogation at the step 110 results in affirmative, a fuelcut is conducted (see a step 112).

If the shift position is not for reverse drive, i.e., the shift position is for forward drive, the interrogation at the step 102 results in negative. Then, a first fuelcut engine revolution speed $N_{MAX}$ and a first fuelcut vehicle speed $V_{SPMAX}$ are set at steps 114 and 116, respectively. The first fuelcut engine revolution speed $N_{MAX}$ and the first fuelcut vehicle speed $V_{SPMAX}$ are greater than the second engine revolution speed $N_{MAXR}$ and second vehicle speed $V_{SPMAX}$, respectively.

There is an interrogation at a step 118 whether the engine revolution speed N is greater than the first fuelcut engine revolution speed $N_{MAX}$ or not. If the interrogation at the step 118 results in negative, there is another interrogation at a step 120 whether the vehicle speed $V_{SP}$ is greater than the first fuelcut vehicle speed $V_{SPMAX}$ or not. If the interrogation at the step 120 results in negative, there occurs no fuelcut and thus the fuel injection control continues (see the step 122). If the interrogation at the step 118 results in affirmative or the interrogation at the step 120 results in affirmative, a fuelcut is conducted (see the step 112).

Figure 4:
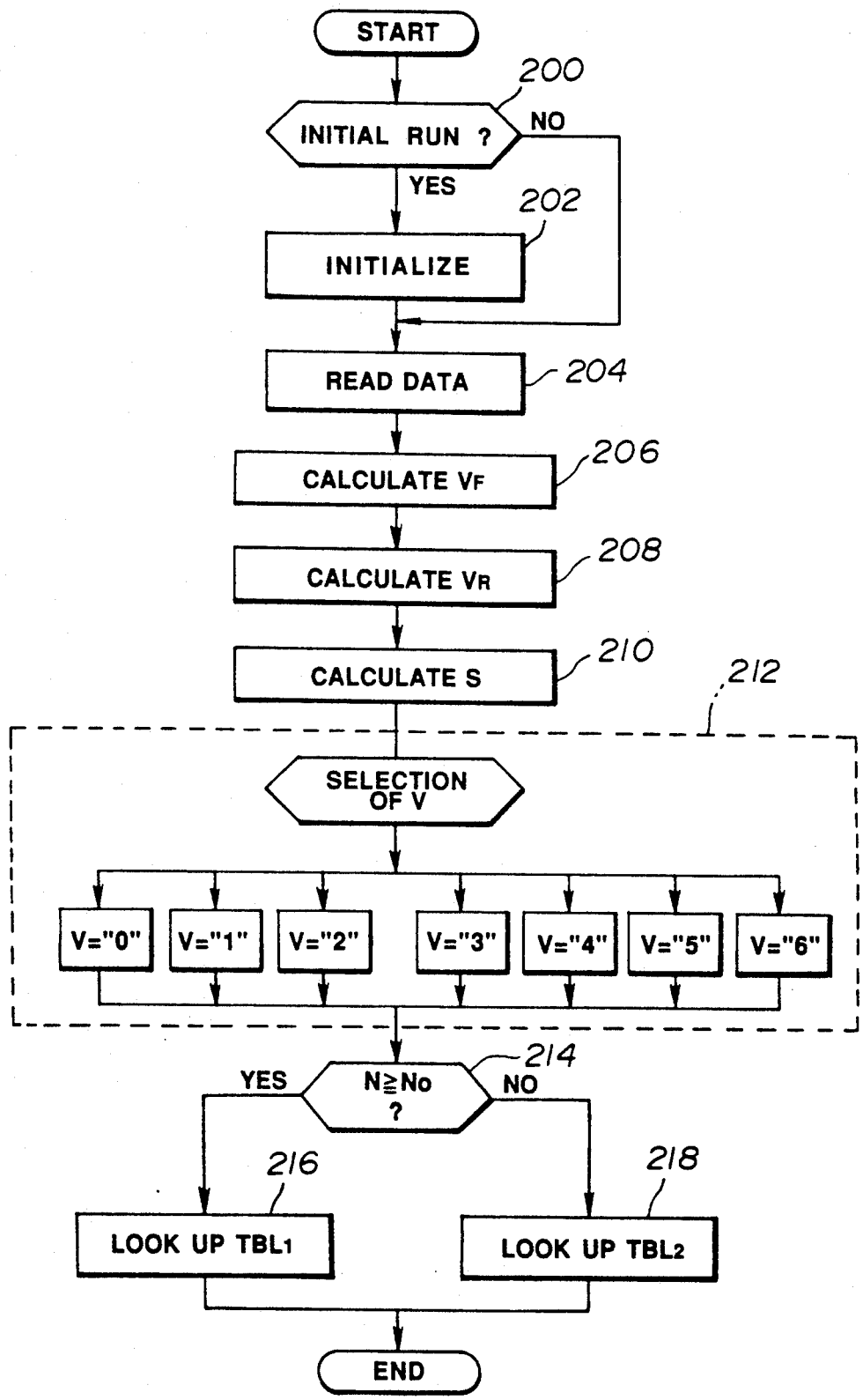
FIG. 4 is a flow diagram of an example of a routine to determine a number and an arrangement of cylinders to be disabled during split operation of the engine.

Referring to the flow diagram shown in FIG. 4, a traction control routine is explained.

In FIG. 4, there is an interrogation at a step 200 whether the present run of the routine is an initial one immediately after start-up of the engine or not. If this is the case, various variables are initialized at a step 202. This initialization step 202 is passed in the subsequent runs of the routine. At a step 204, there are performed reading operations of an engine revolution speed N, a left drive wheel revolution speed $V_{FL}$, a right drive wheel revolution speed $V_{FR}$, a left free running wheel revolution speed $V_{RL}$, and a right free running wheel revolution speed $V_{RR}$. At the next step 206, a drive wheel revolution speed $V_F$ as expressed by the following equation (3) is calculated, and then at a step 208, a free running wheel revolution speed $V_R$ as expressed by the following equation (4) is calculated.

$$V_F = (V_{FL} + V_{FR})/2 \qquad (3)$$

$$V_R = (V_{RL} + V_{RR})/2 \qquad (4)$$

At the next step 210, a slip rate S as expressed by the following equation (5) is calculated.

$$S = (V_F - V_R)/V_F \qquad (5)$$

This step 210 is followed by a block 212 indicated by a broken line drawn rectangle. Briefly, the slip rate S calculated is compared with different reference values $S_0$, $S_1$, $S_2$, $S_3$, $S_4$, and $S_5$. The relationships are $S_0 < S_1 < S_2 < S_3 < S_4 < S_5$. As a result of the comparison of the slip rate S with these reference values, a number of cylinders V to be disabled by fuelcut is selected or determined. Since the engine has six cylinders, the minimum of the number V is "0" (zero), while the maximum is "6". Thus, the number V ranges from "0" to "6". The comparison conditions and their results are as follows:

If $S < S_0$, then $V = 0$.

If $S_0 < S < S_1$, then $V = 1$.

If $S_1 < S < S_2$, then $V = 2$.

If $S_2 < S < S_3$, then $V = 3$.

If $S_3 < S < S_4$, then $V = 4$.

If $S_4 < S < S_5$, then $V = 5$.

If $S < S_5$, then $V = 6$.

After the block 212, there is an interrogation at a step 214 whether the engine revolution speed N is greater than or equal to a predetermined value $N_0$ or not. If this interrogation 214 results in negative, a table look-up operation of a second fuelcut cylinder designating table $TBL_2$ shown in FIG. 6 is performed at a step 218 since the exhaust gas temperature should be low under this condition. If $N \geq N_0$, a table look-up operation of a first fuelcut cylinder designating table $TBL_1$ shown in FIG. 5 is performed at a step 216 since the exhaust gas temperature should be high under this condition. The table look-up operation at the step 216 or 218 is performed using the number V determined at the block 212. After the table look-up operation, the fuelcut cylinders corresponding in number to V are designated. Then, the routine comes to an end point.

Referring to FIGS. 5 and 6, the reference character "C" represents a cylinder to be disabled by fuelcut. The firing order of the engine 1 used in this embodiment is a number one cylinder #1, a number two cylinder #2, a number three cylinder #3, a number four cylinder #4, a number five cylinder #5, and a number six cylinder #6 in this order. The first table $TBL_1$ shown in FIG. 5 is designed to designate one or a plurality of cylinders such that the cylinders are disabled continuously with respect to the firing order. For example, if $V = 1$, the number one cylinder #1 is disabled. If $V = 2$, the number one and two cylinders #1 and #2 are disabled. If $V = 3$, the number one, two, and three cylinders #1, #2 and #3 are disabled. If $V = 4$, the number one, two, three, and four cylinders #1, #2, #3 and #4 are disabled. If $V = 5$, the number one, two, three, four, and five cylinders #1, #2, #3, #4 and #5 are disabled. If $V = 6$, all of the cylinders #1, #2, #3, #4, #5 and #6 are disabled.

The second table $TBL_2$ shown in FIG. 6 is designed to designate one or a plurality of cylinders such that the cylinders are disabled at regular intervals with respect to the firing order. For example, if $V = 1$, the number one cylinder #1 is disabled. If $V = 2$, the number one and four cylinders #1 and #4 are disabled. If $V = 3$, the number one, three, and five cylinders #1, #3 and #5 are disabled. If $V = 4$, the number one, three, four, and six cylinders #1, #3, #4 and #6 are disabled. If $V = 5$, the number one, two, three, four, and six cylinders #1, #2, #3, #4 and #6 are disabled. If $V = 6$, all of the cylinders #1, #2, #3, #4, #5 and #6 are disabled.

From the preceding description in connection with FIGS. 4 to 6, it is now understood that if the engine revolution speed N is less than the predetermined value $N_0$, a table look-up of the second table $TBL_2$ shown in FIG. 6 is performed and the disabled cylinders are designated at regular intervals with respect to the firing order. If the engine revolution speed N is greater than or equal to the predetermined value $N_0$, a table look-up operation of the first table $TBL_1$ shown in FIG. 5 is performed and the disabled cylinders are designated continuously with respect to the firing order. With the second table $TBL_2$ if $N < N_0$, the stability of engine running at low revolution speeds is ensured by smoothing out torque variations. With the first table $TBL_1$ is $N \geq N_0$, the rise in exhaust gas temperature owing to the fuelcut is suppressed, resulting in reduction in deterioration of catalyst. Thus, it will be appreciated that prevention of vehicle vibrations at low speeds and reduction in toxic components in the exhaust gases are accomplished.

In the flow diagram shown in FIG. 4, two tables $TBL_1$ and $TBL_2$ are selectively used as a result of comparison of the engine revolution speed N with the predetermined value $N_0$. This selection may be made as a result of comparison of the engine exhaust gas temperature with a predetermined value. This is further described in connection with FIG. 7.

Figure 7:
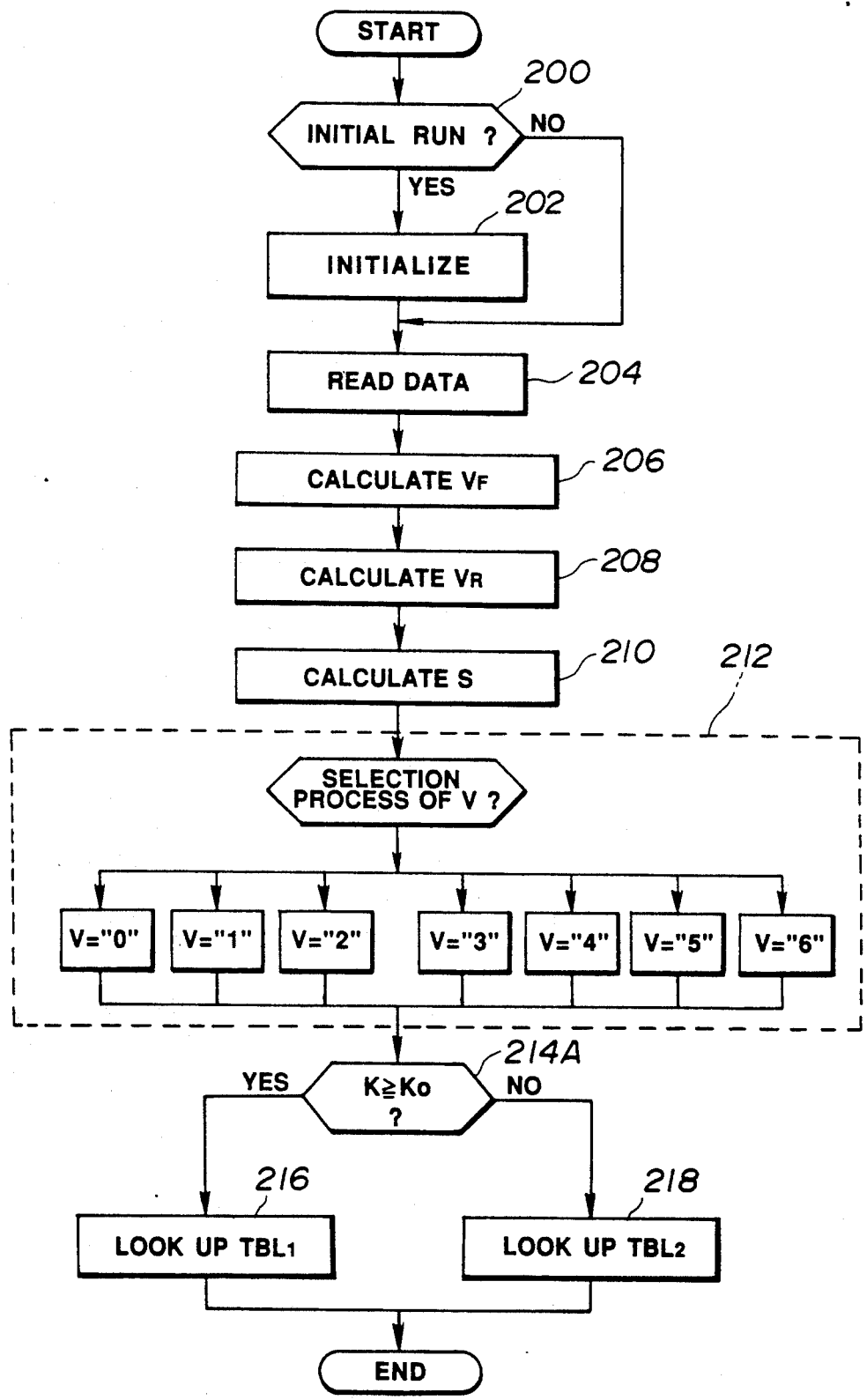
FIG. 7 is a flow diagram of an alternative to FIG. 4.

FIG. 7 is a flow diagram illustrating an alternative routine used in a second embodiment. This second embodiment is substantially the same as the first embodiment except that the routine shown in FIG. 4 is replaced with the alternative routine shown in FIG. 7. This routine shown in FIG. 7 is substantially the same as its counterpart shown in FIG. 4 except in the following respects. At a step 204 in FIG. 7, an exhaust gas temperature K detected by a temperature sensor 27 (see FIG. 1) is read and stored, too. Instead of the interrogation at the step 214 in FIG. 4 there is an interrogation at a step 214A in FIG. 7 whether the exhaust gas temperature K is greater than or equal to a predetermined value $K_0$ or not. If this is the case, a table look-up operation of the first table $TBL_1$ is performed at a step 216. If K is less than $K_0$, a table look-up operation of the second table $TBL_2$ is performed at a step 218.

FIG. 8 is a flow diagram of another alternative routine used in a third embodiment. This third embodiment is substantially the same as the first embodiment except that the selection of the two tables is made in response to a length of time elapsed from beginning of engine torque reduction control by fuelcut. This is based on the logic that the exhaust gas temperature will increase with increased length of time beginning with the fuelcut engine torque reduction control. Specifically, the routine shown in FIG. 8 is different from its counterpart shown in FIG. 4 in the provision of steps 214B, 214C and 214D in the place of the step 214.

In FIG. 8 there is an interrogation at the step 214B whether a slip rate S is greater than or equal to the minimum reference value $S_0$. If S is less than $S_0$, i.e., the engine torque reduction control by fuelcut is not in progress, a timer TMR is reset at the step 214D. If S is greater than or equal to $S_0$, the timer TMR is increased by 1 (one) at the step 214C. The increment of the timer TMR is repeated as long as $S \geq S_0$ holds in the subsequent runs of the routine. Following the step 214C or 214D is an interrogation at the step 214E whether the timer TMR is greater than or equal to a predetermined time value $T_0$ or not. If $TMR \geq T_0$, a table look-up operation of the first table $TBL_1$ is performed at a step 216. If $TMR < T_0$, a table look-up operation of the second table $TBL_2$ is performed at a step 218.

The content of the timer TMR incremented in this routine represents a length of time elapsed from beginning of fuelcut operation to effect engine torque down control to suppress occurrence of slip.

Thus, according to the third embodiment, if the length of time is still short, the second table $TBL_2$ is used to ensure stability of engine running since the rise in exhaust temperature is not great under this condition. However, if the length of time becomes long, the first table $TBL_1$ is used since the exhaust gas temperature becomes high under this condition.

What is claimed is:

1. A method of a traction control in a vehicle having a drive wheel and a multi-cylinder engine with an exhaust system including a catalytic converter, the method comprising the steps of:
    determining a slip rate of the vehicle and generating a slip rate indicative signal indicative of said slip rate determined;
    determining, in number, a portion of the cylinders of the engine to be disabled in response to said slip rate indicative signal and generating a number indicative signal indicative of said number determined;
    determining a parameter indicative of a temperature of exhaust gases issued by the engine during partial operation and generating a parameter indicative signal indicative of said parameter determined; and
    determining an arrangement of that portion of the cylinders indicated by said number indicative signal in response to said parameter indicative signal.

2. A method as claimed in claim 1, wherein when said parameter indicative signal indicates that the temperature of exhaust gases stays low enough not to deteriorate the catalytic converter, said arrangement determined designates cylinders to be disabled at regular intervals with respect to the firing order of all of the cylinders of the engine, while when said parameter indicative signal indicates that the temperature of exhaust gases is so high as to increase the possibility of deteriorating the catalytic converter, said arrangement determined designates cylinders to be disabled continuously with respect to the firing order of all of the cylinders of the engine.

3. A method as claimed in claim 2, wherein said parameter determined is an engine revolution speed of the engine.

4. A method as claimed in claim 2, wherein said parameter determined is an exhaust gas temperature of the exhaust gases.

5. A method as claimed in claim 2, wherein said parameter determined is a length of time beginning with rendering said portion of the cylinders to be disabled.

6. In a system for a traction control in a vehicle having a drive wheel and a multi-cylinder engine with an exhaust system including a catalytic converter,
    means for determining a slip rate of the vehicle and generating a slip rate indicative signal indicative of said slip rate detected;
    means for determining, in number, a portion of the cylinders of the engine to be disabled in response to said slip rate indicative signal and generating a number indicative signal indicative of said number determined;
    means for determining a parameter indicative of temperature of exhaust gases issued by the engine during partial operation and generating a parameter indicative signal indicative of said parameter determined; and
    means for determining an arrangement of that portion of the cylinders indicated by said number indicative signal in response to said parameter indicative signal.

7. A method of a traction control in a vehicle having a drive wheel and a multi-cylinder engine with an exhaust system including a catalytic converter, the multi-cylinder engine having a predetermined firing order, the method comprising the steps of:
    determining a slip rate of the vehicle and generating a slip rate indicative signal indicative of said slip rate determined;
    determining, in number, a portion of the cylinders of the engine to be disabled in response to said slip rate indicative signal and generating a number indicative signal indicative of said number determined;
    determining a parameter indicative of a temperature of exhaust gases issued by the engine during partial operation and generating a parameter indicative signal indicative of said parameter determined;
    comparing said parameter indicative signal with a predetermined value and generating a comparison result signal when said parameter indicative signal is not less than said predetermined value; and
    determining a first arrangement which designates that portion of the cylinders indicated by said number indicative signal such that that portion of the cylinders are disabled continuously with respect to the predetermined firing order in response to generation of said comparison result signal and a second arrangement which designates that portion of the cylinders indicated by said number indicative signal such that that portion of the cylinders are disabled at regular intervals with respect to the predetermined firing order in response to absence of said comparison result signal.

8. A method of a traction control in a vehicle having a drive wheel and a multi-cylinder engine with an exhaust system including a catalytic converter, the multi-cylinder engine having a predetermined firing order, the method comprising the steps of:
    determining a slip rate of the vehicle and generating a slip rate indicative signal indicative of said slip rate determined;
    determining, in number, a portion of the cylinders of the engine to be disabled in response to said slip rate indicative signal and generating a number indicative signal indicative of said number determined;
    determining a revolution speed of the engine and generating an engine revolution speed indicative signal indicative of said revolution speed determined;

comparing said engine revolution speed indicative signal with a predetermined value and generating a comparison result signal when said engine revolution speed indicative signal is not less than said predetermined value; and determining a first arrangement which designates that portion of the cylinders indicated by said number indicative signal such that that portion of the cylinders are disabled continuously with respect to the predetermined firing order in response to generation of said comparison result signal and a second arrangement which designates that portion of the cylinders indicated by said number indicative signal such that that portion of the cylinders are disabled at regular intervals with respect to the predetermined firing order in response to absence of said comparison result signal.

9. A method of a traction control in a vehicle having a drive wheel and a multi-cylinder engine with an exhaust system including a catalytic converter, the multi-cylinder engine having a predetermined firing order, the method comprising the steps of:

determining a slip rate of the vehicle and generating a slip rate indicative signal indicative of said slip rate determined;

determining, in number, a portion of the cylinders of the engine to be disabled in response to said slip rate indicative signal and generating a number indicative signal indicative of said number determined;

determining a temperature of exhaust gases issued by the engine during partial operation and generating a temperature indicative signal indicative of said temperature determined;

comparing said temperature indicative signal with a predetermined value and generating a comparison result signal when said temperature indicative signal is not less than said predetermined value; and determining a first arrangement which designates that portion of the cylinders indicated by said number indicative signal such that that portion of the cylinders are disabled continuously with respect to the predetermined firing order in response to generation of said comparison result signal and a second arrangement which designates that portion of the cylinders indicated by said number indicative signal such that that portion of the cylinders are disabled at regular intervals with respect to the predetermined firing order in response to absence of said comparison result signal.

10. A method of a traction control in a vehicle having a drive wheel and a multi-cylinder engine with an exhaust system including a catalytic converter, the multi-cylinder engine having a predetermined firing order, the method comprising the steps of:

determining a slip rate of the vehicle and generating a slip rate indicative signal indicative of said slip rate determined;

determining, in number, a portion of the cylinders of the engine to be disabled in response to said slip rate indicative signal and generating a number indicative signal indicative of said number determined;

determining a length of time beginning with rendering said portion of the cylinders disabled and generating an elapsed time indicative signal indicative of said length determined;

comparing said elapsed time indicative signal with a predetermined value and generating a comparison result signal when said elapsed time indicative signal is not less than said predetermined value; and determining a first arrangement which designates that portion of the cylinders indicated by said number indicative signal such that that portion of the cylinders are disabled continuously with respect to the predetermined firing order in response to generation of said comparison result signal and a second arrangement which designates that portion of the cylinders indicated by said number indicative signal such that that portion of the cylinders are disabled at regular intervals with respect to the predetermined firing order in response to absence of said comparison result signal.

* * * * *